(12) United States Patent
Cilingir et al.

(10) Patent No.: US 10,535,371 B2
(45) Date of Patent: Jan. 14, 2020

(54) SPEAKER SEGMENTATION AND CLUSTERING FOR VIDEO SUMMARIZATION

(71) Applicant: INTEL CORPORATION, Santa Clara, CA (US)

(72) Inventors: Gokcen Cilingir, Santa Clara, CA (US); Narayan Biswal, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 156 days.

(21) Appl. No.: 15/264,126

(22) Filed: Sep. 13, 2016

(65) Prior Publication Data

US 2018/0075877 A1 Mar. 15, 2018

(51) Int. Cl.
| | |
|---|---|
| *H04N 9/80* | (2006.01) |
| *G11B 27/034* | (2006.01) |
| *G06K 9/00* | (2006.01) |
| *G10L 17/02* | (2013.01) |
| *G10L 17/04* | (2013.01) |
| *G10L 17/06* | (2013.01) |
| *G11B 27/30* | (2006.01) |

(52) U.S. Cl.
CPC ........ *G11B 27/034* (2013.01); *G06K 9/00765* (2013.01); *G10L 17/02* (2013.01); *G10L 17/04* (2013.01); *G10L 17/06* (2013.01); *G11B 27/30* (2013.01)

(58) Field of Classification Search
USPC ........................................ 386/241, 248, 278
See application file for complete search history.

(56) References Cited

U.S. PATENT DOCUMENTS

| 9,484,066 B2 * | 11/2016 | Ko .................... G11B 27/034 |
| 2002/0093591 A1 * | 7/2002 | Gong ................ G06F 17/30029 348/515 |

(Continued)

FOREIGN PATENT DOCUMENTS

JP 2014022837 A 2/2014

OTHER PUBLICATIONS

International Search Report dated Nov. 7, 2017 for International Patent Application No. PCT/US2017/045510, 3 pages.

(Continued)

*Primary Examiner* — Nigar Chowdhury
(74) *Attorney, Agent, or Firm* — Finch & Maloney PLLC

(57) ABSTRACT

Techniques are provided for video summarization, based on speaker segmentation and clustering, to identify persons and scenes of interest. A methodology implementing the techniques according to an embodiment includes extracting audio content from a video stream and detecting one or more segments of the audio content that include the voice of a single speaker. The method also includes grouping the one or more detected segments into an audio cluster associated with the single speaker and providing a portion of the audio cluster to a user. The method further includes receiving an indication from the user that the single speaker is a person of interest. Segments of interest are then extracted from the video stream, where each segment of interest is associated with a scene that includes the person of interest. The extracted segments of interest are then combined into a summarization video.

24 Claims, 8 Drawing Sheets

(56) References Cited

U.S. PATENT DOCUMENTS

| | | | | |
|---|---|---|---|---|
| 2004/0143434 | A1* | 7/2004 | Divakaran | G06F 17/30743 704/256 |
| 2005/0004690 | A1* | 1/2005 | Zhang | G10L 25/48 700/94 |
| 2007/0113724 | A1* | 5/2007 | Kim | G10H 1/0025 84/609 |
| 2008/0270344 | A1 | 10/2008 | Yurick | |
| 2009/0089056 | A1* | 4/2009 | Fujii | G06F 17/30746 704/246 |
| 2009/0265170 | A1* | 10/2009 | Irie | G10L 17/26 704/236 |
| 2010/0074590 | A1* | 3/2010 | Momosaki | G11B 27/034 386/278 |
| 2011/0116690 | A1 | 5/2011 | Ross | |
| 2012/0010884 | A1* | 1/2012 | Kocks | G10L 17/00 704/240 |
| 2012/0076357 | A1* | 3/2012 | Yamamoto | G06K 9/00711 382/103 |
| 2013/0108244 | A1 | 5/2013 | Konuma | |
| 2014/0205103 | A1* | 7/2014 | Lu | G10L 25/51 381/56 |
| 2015/0049247 | A1* | 2/2015 | Kajarekar | H04N 7/147 348/484 |
| 2016/0098987 | A1* | 4/2016 | Stolcke | G10L 15/063 704/232 |
| 2016/0217792 | A1* | 7/2016 | Gorodetski | G10L 17/04 |
| 2016/0283185 | A1* | 9/2016 | McLaren | G06F 16/683 |
| 2017/0300752 | A1* | 10/2017 | Biswas | G06K 9/00718 |

OTHER PUBLICATIONS

Written Opinion of the International Searching Authority dated Nov. 7, 2017 for International Patent Application No. PCT/US2017/045510, 6 pages.

Chheng, Tommy, "Video Summarization Using Clustering", Department of Computer Science University of California, Irvine, 2007, 7 pages.

Kotti, M. et al., "Speaker Segmentation and Clustering." Signal processing, May 5, 2008, vol. 88, 54 pages.

Lee, Y.S., et al., "Video Summarization Based on Face Recognition and Speaker Verification", 2015 IEEE 10th Conference on Industrial Electronics and Applications, Jun. 2015, pp. 1821-1824.

Luthra, V. et al., "A Machine Learning Based Approach to Video Summarization", 2008, 5 pages.

Nagao, N. et al., "Annotation-based Multimedia Summarization and Translation", Proceedings of the 19th International Conference on Computation Allinguistics, 2002, vol. 1, 7 pages.

International Preliminary Report on Patentability dated Mar. 28, 2019 for International Patent Application No. PCT/US2017/045510, 8 pages.

* cited by examiner

User-Assisted Video
Summarization
Circuit
206

Video Stream(s)
110

↓

Audio
Extraction
Circuit
302

↓

Segment Boundary
Determination
Circuit
402

↓

Segment
Combination
Circuit
404

↓

Summarized
Video
120

FIG. 4

SPEAKER SEGMENTATION AND CLUSTERING FOR VIDEO SUMMARIZATION

BACKGROUND

As home video collections grow in size, video management technologies are becoming increasingly important. One such example is video summarization, which can provide a summary of each video in the user's collection or library. The summary may comprise a collection of clips from the video that include scenes of interest, particular acoustic events, and/or persons of interest in a scene. Video summarization can be based, at least in part, on speaker recognition to identify voices of persons of interest in any given scene. Speaker recognition technologies, however, generally rely on the use of speaker models to achieve satisfactory results. These models are created through lengthy training/enrollment sessions which can involve the collection of five to ten minutes worth of speech from each speaker. In real world applications, such as video summarization, it is impractical or unrealistic to expect all of the persons or characters in the video to be available for speaker model training.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

FIG. 4 is a more detailed block diagram of a user-assisted video summarization circuit, configured in accordance with certain embodiments of the present disclosure.

Figure 1:
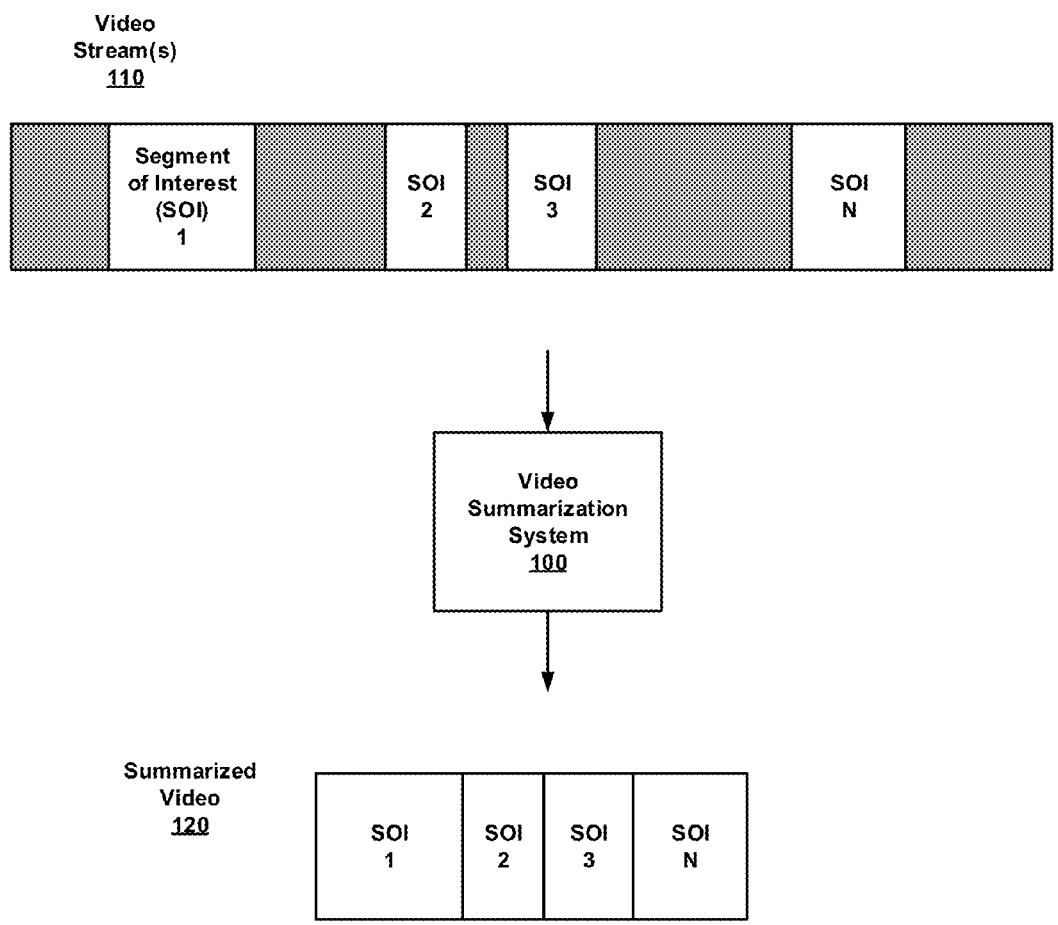
FIG. 1 is a top level diagram of an implementation of a video summarization system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for video summarization, based on speaker segmentation and clustering, to identify persons and scenes of interest without relying on pre-trained speaker recognition models. Video summarization as used herein is a tool that can be used in the management of collections of video media from any source. A video summary can comprise, for example, a collection of clips from the video that include scenes of interest, particular acoustic events, and/or persons of interest in particular scenes. As previously explained, existing summarization methods rely on speaker recognition techniques to identify voices of persons of interest. Such traditional methods require pre-training of speaker models for each of the speakers in the video to achieve satisfactory results, which is generally not practical. The disclosed techniques use speaker segmentation and clustering to identify audio clips where a single speaker is talking. Guidance is provided from the user to indicate whether or not that single speaker is a person of interest (POI). When all persons of interest are identified, a summarization video can then be generated based on scenes that include the identified one or more POIs, thus avoiding the requirement for pre-training of speaker models.

In accordance with an embodiment, the disclosed techniques can be implemented, for example, in a computing system or an audio/video processing system, or a software product executable or otherwise controllable by such systems. The system or product is configured to detect one or more segments of an audio stream, wherein each of the segments include the voice of a single speaker. The audio stream is extracted from the video stream which is to be summarized. The system is also configured to group the one or more detected segments into an audio cluster associated with that single speaker. Some portion of the audio cluster is provided to a user, for example, through a graphical user interface or other suitable mechanism for allowing user feedback. In any case, an indication is received from the user as to whether or not the single speaker is a person of interest (POI). The system is further configured to extract segments of interest (SOIs) from the video stream, wherein each SOI is associated with a scene that includes the POI. The extracted segments of interest are combined or concatenated to generate the summarization video associated with the POI, according to an embodiment.

For purposes of clarity, a video generally includes both visual and audio components, regardless of how that content is sourced. To this end, the use of the word "stream" herein is not intended to limit the present disclosure to a particular type of video, such as so-called streaming video. Rather, the video can be in any format and sourced in any number of ways and need not be limited to content that is streamed. For instance, a video to be summarized as provided herein can be locally sourced from a machine readable medium such as a DVD, hard disk, solid-state drive, memory stick, or other non-transitory medium from which playback can be carried out (in such cases, use of the word "stream" may refer to video data read from the medium). Alternatively, the video can be remotely sourced from a cloud-based video streaming service or video on-demand service (e.g., NETFLIX or COMCAST on-demand), or a video download service that allows rental or purchase of videos (in such cases, use of the word "stream" may refer to video data transmitted from a remote location to a local location, relative to the user). In any such cases, whether accessed locally or remotely and regardless of its source, a given video to be summarized is generally characterized herein as including a video stream that includes an audio stream. The audio stream can be any audio content provided with the video stream, whether it be included in data collected from a tangible medium or data transmitted via a network.

Thus, the techniques described herein may allow for improved video summarization, based on user provided guidance or feedback as to persons of interest, compared to existing methods that rely on pre-trained speaker recognition models, according to an embodiment. Additionally, in some embodiments, the disclosed techniques provide for the optional training and generation of speaker models, based on single speaker segments and clusters extracted from the video, to allow for more autonomous video summarization of future video streams, as will be explained in greater detail below. As will be appreciated, the disclosed techniques can be implemented on a broad range of computing and communication platforms, including workstations, laptops, tablets, and mobile computing devices. These techniques may further be implemented in hardware or software or a combination thereof, as will be further appreciated.

FIG. 1 is a top level diagram of an implementation of a video summarization system, configured in accordance with certain embodiments of the present disclosure. The video summarization system 100 is configured to process a video stream 110 that contains segments of interest to the user or owner of the video. These segments may be of interest to the user because they include particular scenes, acoustic events, persons of interest, or for any other reason deemed important to the user. According to an embodiment, the video summarization system 100 detects these segments of interest (SOIs) from the video stream 110 and generates as summarization video 120 by grouping or concatenating the SOIs, as will be explained in greater detail below. In some embodiments, the summarization process may be guided by user input. In some embodiments, speaker recognition models may be developed during the video summarization process to permit more autonomous operation on future video summarizations.

Figure 2:
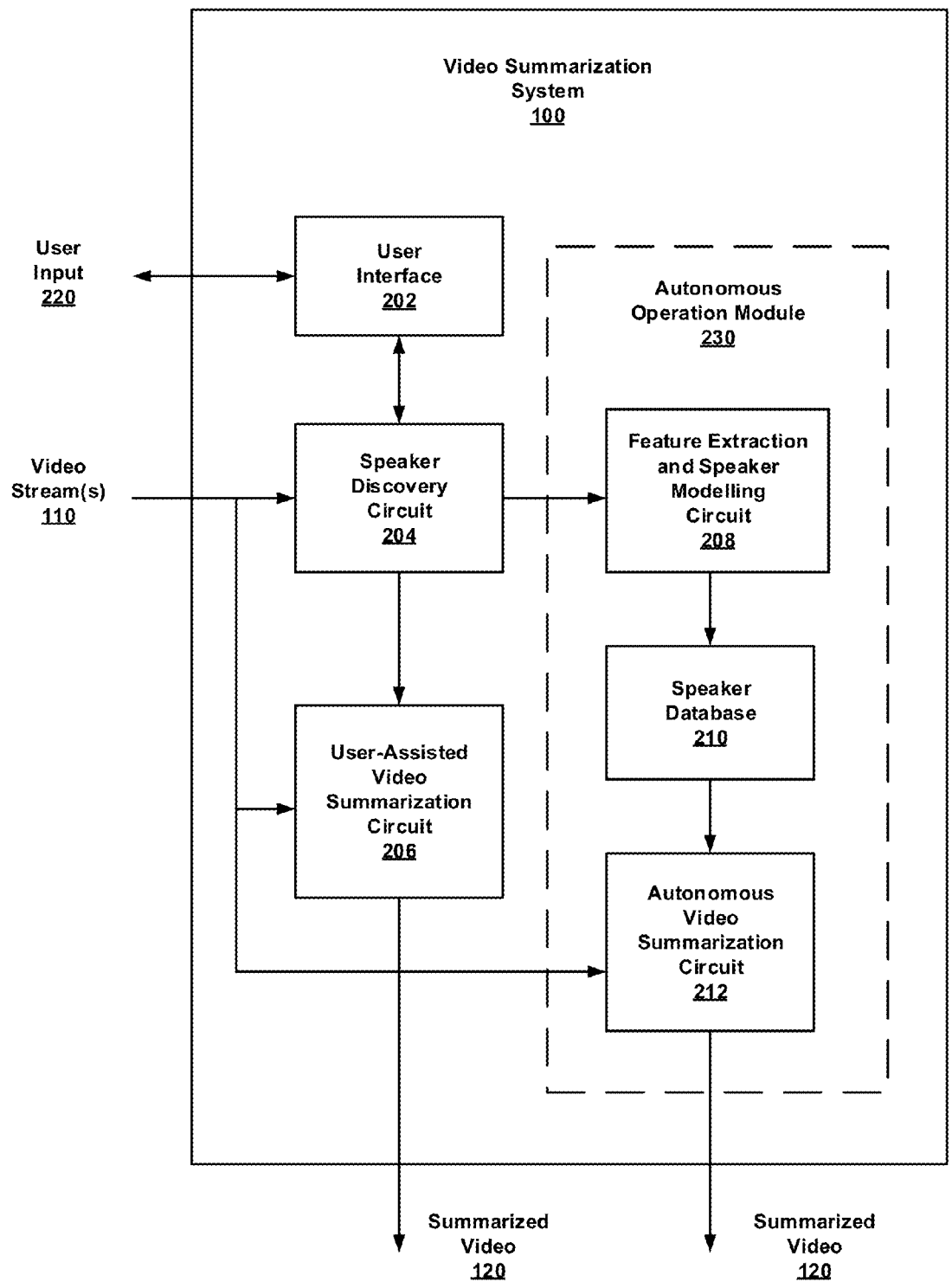
FIG. 2 is block diagram of a video summarization system, configured in accordance with certain embodiments of the present disclosure.

FIG. 2 is block diagram of a video summarization system 100, configured in accordance with certain embodiments of the present disclosure. The video summarization system 100 is shown to include a user interface 202, a speaker discovery circuit 204, and a user-assisted video summarization circuit 206, the operations of which will be described in greater detail below in connection with FIGS. 3 and 4. In some embodiments, the video summarization system 100 may also include an autonomous operation module 230, which is shown to further include a feature extraction and speaker modelling circuit 208, a speaker database 210, and an autonomous video summarization circuit 212, the operations of which will be described in greater detail below in connection with FIGS. 5 and 6.

At a high level, the speaker discovery circuit 204 is configured to detect and cluster segments of the video that contain a single speaker. These segments may then be presented to the user for guidance as to whether that speaker is a person of interest (POI). The video summarization circuit 206 is configured to find and extract segments of interest (SOIs) from the video stream, where each SOI is associated with a scene that includes the POI. These segments are then combined to generate the summarization video 120. Also at a high level, the optional autonomous operation module 230 is configured to generate and maintain a speaker model database, using feature vectors extracted from the single speaker segments that have been identified as POIs. These models may then be used in future video summarizations to improve speaker clustering accuracy and/or to eliminate the need for user input and guidance in identifying POIs.

Figure 3:
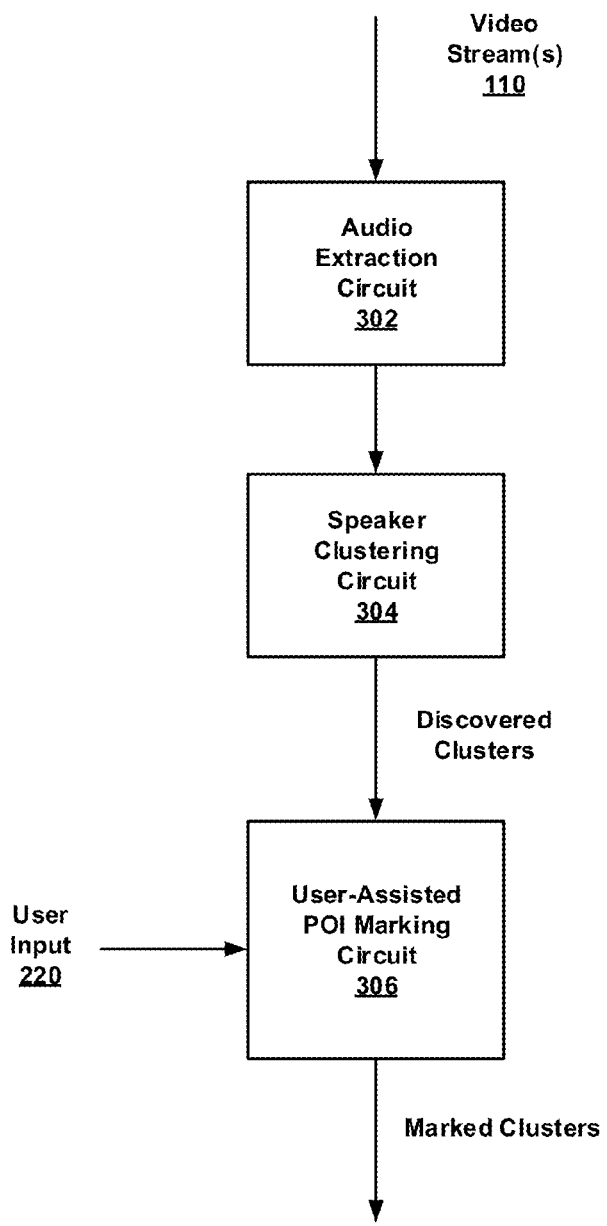
FIG. 3 is a more detailed block diagram of a speaker discovery circuit, configured in accordance with certain embodiments of the present disclosure.

FIG. 3 is a more detailed block diagram of speaker discovery circuit 204, configured in accordance with certain embodiments of the present disclosure. The speaker discovery circuit 204 is configured to identify audio clips from the input video stream that contain the voice of a single speaker, cluster those clips for presentation to the user, and obtain user guidance as to whether that speaker is a POI. The speaker discovery circuit 204 is shown to include an audio extraction circuit 302, a speaker clustering circuit 304, and a user-assisted POI marking circuit 306.

The audio extraction circuit 302 is configured to extract an audio stream from the video stream. As will be appreciated in light of this disclosure, the audio stream need not be streaming audio. Rather, the audio stream generally refers to any audio content associated with the video stream. The speaker clustering circuit 304 is configured to detect one or more segments of the audio stream that include the voice of a single speaker and group the detected segments into an audio cluster associated with that single speaker. Each cluster will thus contain speech from a single speaker, and occurrences of speech from that single speaker will be classified into the same cluster. Single speaker detection and clustering may be performed using known techniques in light of the present disclosure.

The user-assisted POI marking circuit 306 is configured to provide at least some portion of the audio cluster to a user and to receive an indication from the user that the single speaker is a person of interest. This may be accomplished through user interface 202, which in some embodiments may be a graphical user interface. The user input may be as simple as a yes or no to indicate that the speaker is, or is not, a POI. In some embodiments, the user-assisted POI marking circuit 306 may be further configured to receive an identification of the POI from the user. The identification may be associated with an existing or subsequently developed speaker model, as described in greater detail below. Additionally, in some embodiments, the user-assisted POI marking circuit 306 may be configured to track a frequency of occurrence of POIs to generate a list of favorite (or frequent) POIs for video summarization of additional video streams.

FIG. 4 is a more detailed block diagram of user-assisted video summarization circuit 206, configured in accordance with certain embodiments of the present disclosure. The user-assisted video summarization circuit 206 is configured to generate a video summarization based on the user guidance that was provided for identifying persons of interest above. The user-assisted video summarization circuit 206 is shown to include the audio extraction circuit 302, a segment boundary determination circuit 402, and a segment combination circuit 404.

The audio extraction circuit 302, as described above, is configured to extract the audio stream from the video stream. The segment boundary determination circuit 402 is configured to determine boundaries of scenes of interest, from the video stream. The scenes of interest are based on the detection of the person of interest in the scene, whether or not they are a single speaker in that scene. The segment combination circuit 404 is configured to combine portions of the video stream within the scene boundaries to generate a summarization video. There may, of course, be more than one person of interest to the user, and thus the video summarization can contain scenes in which multiple persons of interest appear.

Figure 5:
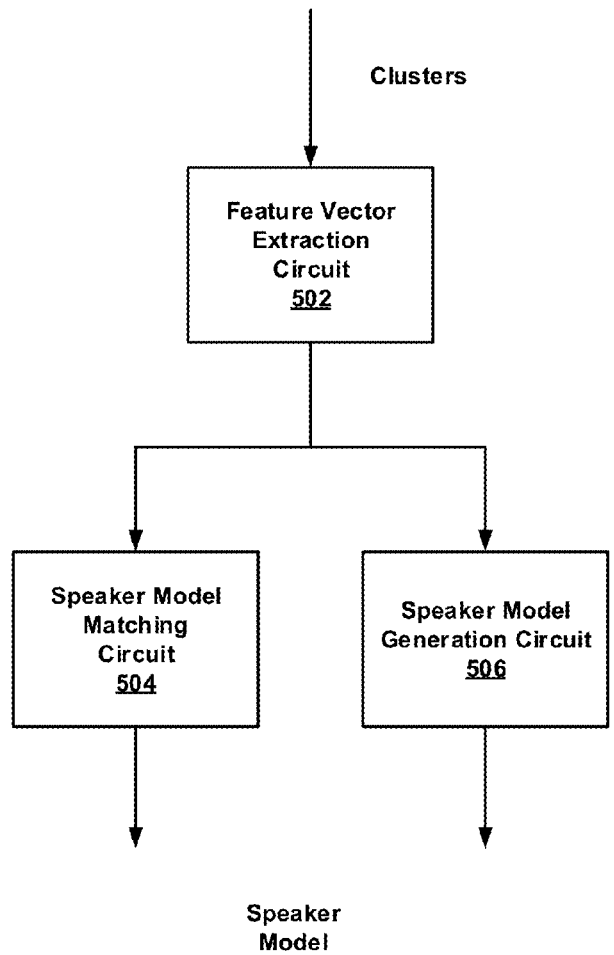
FIG. 5 is a more detailed block diagram of a feature extraction and speaker modelling circuit, configured in accordance with certain embodiments of the present disclosure.

FIG. 5 is a more detailed block diagram of feature extraction and speaker modelling circuit 208, configured in accordance with certain embodiments of the present disclosure. The feature extraction and speaker modelling circuit 208 is shown to include a feature vector extraction circuit 502, a speaker model matching circuit 504, and a speaker model generation circuit 506. Feature vector extraction and speaker model designation is performed in response to receiving the indication that the single speaker is a POI.

The feature vector extraction circuit 502 is configured to extract feature vectors from the audio clusters. Feature vectors capture information associated with the speech in an audio signal typically represented by short time spectrums (e.g., frames of 20 to 40 milliseconds). Feature vector extraction may be performed using Mel-Frequency Cepstral Coefficients (MFCC) or other known techniques in light of the present disclosure.

Extracted feature vectors, from an audio segment, are used to model a speaker's voice. Gaussian mixture models, vector quantization, support vector machines and deep neural networks are methods that may be used for speaker modeling, in light of the present disclosure. Generally, the quantity and diversity of the collected feature vectors determine the quality of the modeling process.

The speaker model matching circuit 504 is configured to match the feature vectors to an existing speaker model, if possible, and designate that existing speaker model as the speaker model associated with the single speaker. If feature matching to an existing model is not successful (or if such models do not yet exist), a new model is generated. The speaker model generation circuit 506 is configured to, in response to a failure of the matching, generate a new speaker model based on the extracted feature vectors, and designate the new speaker model as the speaker model associated with the single speaker.

For example, in some embodiments, as new extracted features become available they may be collected and sorted into existing bins, where each bin is associated with a speaker and speaker model. The sorting is based on a consistency check between the new feature vectors and the vectors previously sorted into the bins. If the consistency check does not meet a threshold consistency requirement, a new bin is created with the assumption that the new feature vector is associated with a new speaker to which the system has not yet been exposed. The consistency requirement can be defined in any suitable manner. For example, a distance metric (such as a Euclidean distance) can be defined in the feature space, and the consistency threshold can be based on the number of feature vectors that are considered to be "close enough" to one or more feature vectors in the existing bin, where "close enough" is another suitable threshold value. Alternatively, a Gaussian mixture model (or any other speaker modeling method) can be fitted to the existing vectors in a bin and an average likelihood can be calculated for a given set of feature vectors. Most speaker modeling algorithms are amenable to this technique as they inherently generate an output score or likelihood measurement for a given feature vector.

When the correct bin is determined for a given set of feature vectors, the vectors are added to that bin and the bin is analyzed to see if a speaker model enrollment/training sufficiency criterion is met. This criterion ensures that there is enough data in the bin to confidently train a speaker model, and is based on the quantity and diversity of the feature vectors collected into the bin. Diversity can be quantified based on a variance metric in the feature space, or through the use of phoneme prediction algorithms to build a phoneme histogram from which a distance can be calculated to the natural histogram of the language. When the speaker model enrollment/training sufficiency criterion is met, the speaker model is trained and stored in a speaker model database. The bin used for this modeling remains linked with the speaker model database entry so that the speaker model may be further adapted if more data is later collected from the same speaker.

In some embodiments, the stored speaker models may be used for future video summarization of additional video streams to improve speaker clustering and/or to eliminate the need for user guidance in determining person of interest. In some embodiments, the user may provide names or other identification of the persons of interest and this information may be stored in the database along with the speaker models.

Figure 6:
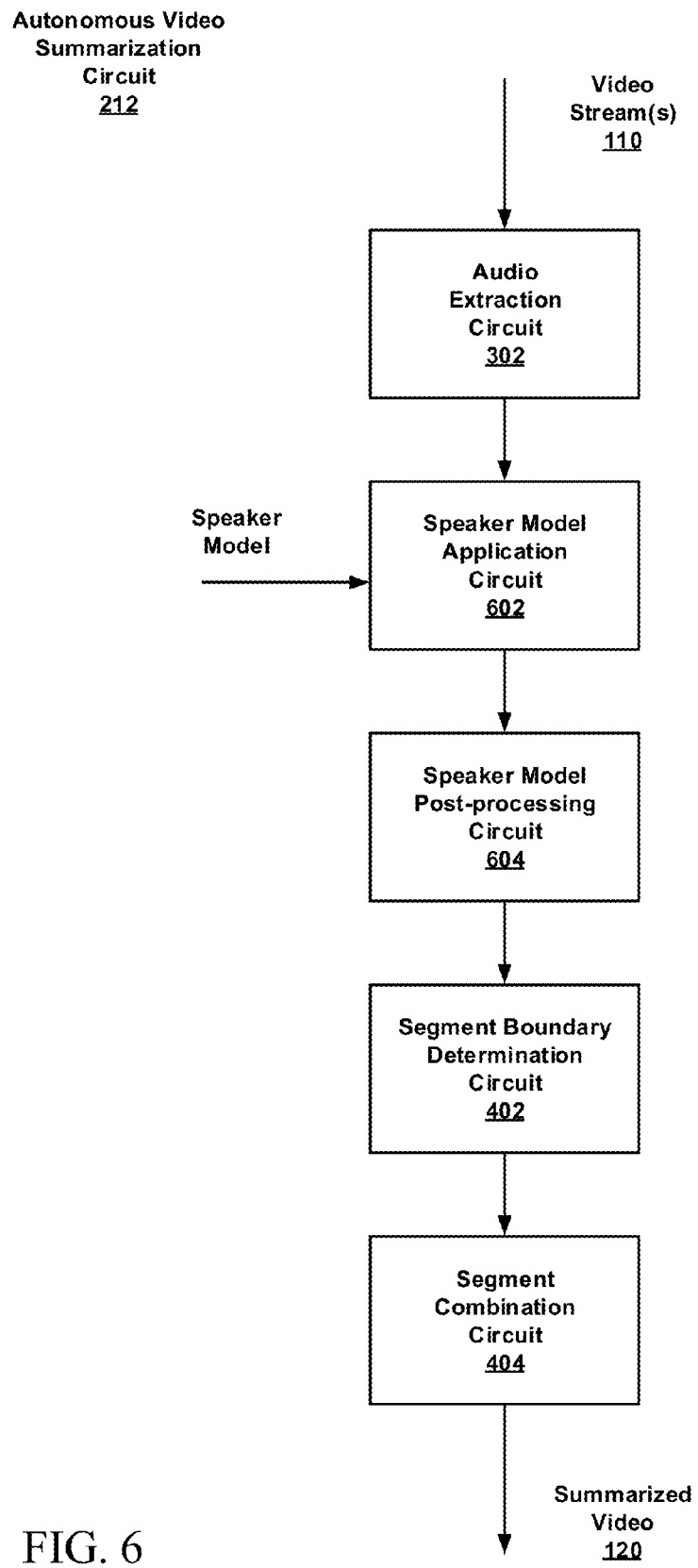
FIG. 6 is a more detailed block diagram of an autonomous video summarization circuit, configured in accordance with certain embodiments of the present disclosure.

FIG. 6 is a more detailed block diagram of autonomous video summarization circuit 212, configured in accordance with certain embodiments of the present disclosure. The autonomous video summarization circuit 212 is shown to include the audio extraction circuit 302, a speaker model application circuit 602, a speaker model post-processing circuit 604, the segment boundary determination circuit 402, and the segment combination circuit 404.

The audio extraction circuit 302, as described above, is configured to extract an audio stream from the video stream. The speaker model application circuit 602 is configured to apply the designated speaker model, whether existing or newly generated, as described above, to the extracted audio stream to detect regions of the audio stream (which generally refers to one or more portions of audio content provided in the video stream, whether actually streamed or not) associated with one or more of the persons of interest. The speaker model post-processing circuit 604 is configured to evaluate the speaker model predictions based on score and duration thresholds generated by the speaker model.

The segment boundary determination circuit 402 is configured to determine boundaries of scenes of interest, from the video stream. The scenes of interest are based on the detection of the person of interest in the scene, based on the speaker model prediction. The "importance" of a scene may be assessed and adjusted based on the number of persons of interest that are detected in the scene. In some embodiments, a list of "favorite persons" may be maintained, updated, and referenced for the summarization of the current video as well as subsequent videos. The segment combination circuit 404 is configured to combine those portions of the video stream within the scene boundaries, which are determined to be most important, to generate a summarization video.

Methodology

Figure 7:
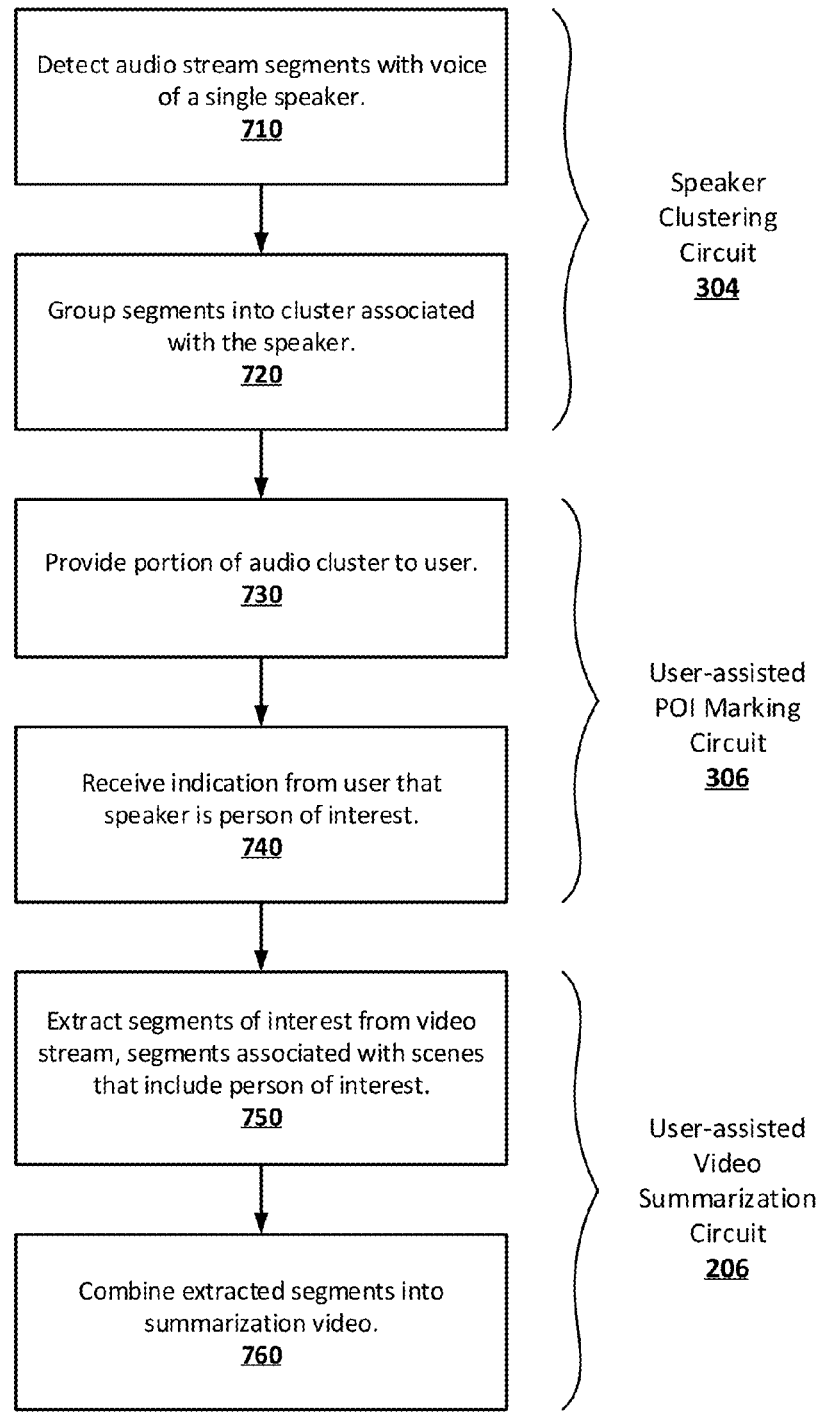
FIG. 7 is a flowchart illustrating a methodology for video summarization, in accordance with certain embodiments of the present disclosure.

FIG. 7 is a flowchart illustrating an example method 700 for video summarization based on speaker segmentation and clustering, in accordance with certain embodiments of the present disclosure. As can be seen, example method 700 includes a number of phases and sub-processes, the sequence of which may vary from one embodiment to another. However, when considered in the aggregate, these phases and sub-processes form a process for video summarization in accordance with certain of the embodiments disclosed herein. These embodiments can be implemented, for example using the system architecture illustrated in FIGS. 2-6 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 7, in one embodiment, method 700 for video summarization commences by detecting, at operation 710, one or more segments of an audio stream that include the voice of a single speaker. The audio stream is extracted from the video stream that is to be summarized. Next, at operation 720, the one or more detected segments are grouped into an audio cluster associated with the single speaker.

At operation 730, some portion of the audio cluster is provided to the user. In some embodiments, the portion may be a relatively short clip that is chosen as a representative sample or it may be the entire audio cluster. At operation 740, an indication is received from the user that the single speaker is a person of interest (POI). In some embodiments, a graphical user interface is configured to play the audio and receive the POI indication.

At operation 750, segments of interest (SOIs) are extracted from the video stream. Each SOI is associated with a scene that includes the POI. At operation 760, the extracted SOIs are combined or merged to create a summarization video.

Of course, in some embodiments, additional operations may be performed, as previously described in connection with the system. For example, feature vectors may be extracted from the audio cluster and used to find an existing speaker model or generate a new speaker model that matches the single speaker or POI. In some embodiments, those speaker models may be used to recognize POIs without user assistance, and thus enable autonomous generation of summarizations.

Example System

Figure 8:
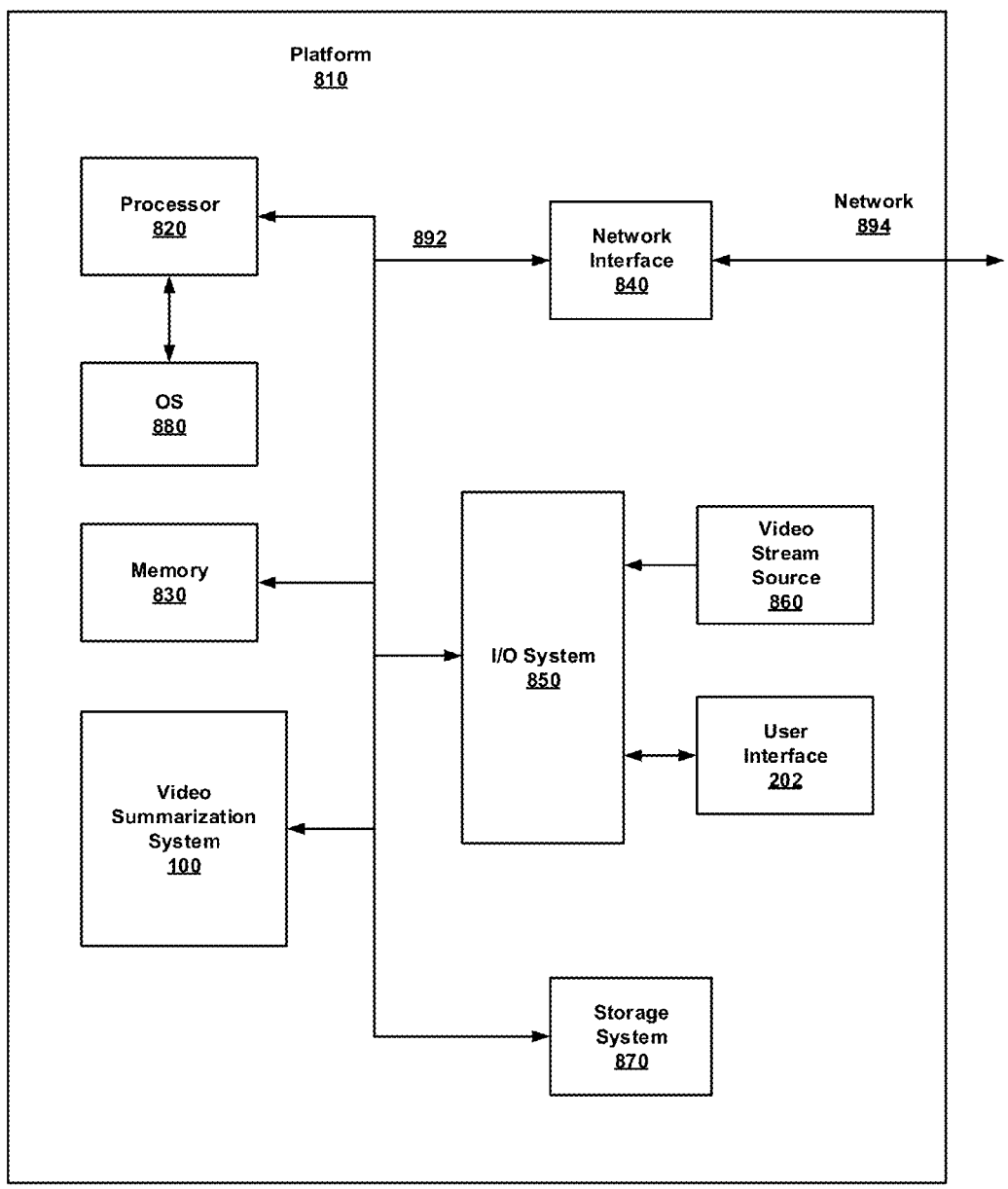
FIG. 8 is a block diagram schematically illustrating a system platform to perform video summarization, configured in accordance with certain embodiments of the present disclosure.

FIG. 8 illustrates an example system 800 to perform video summarization based on speaker segmentation and clustering, configured in accordance with certain embodiments of the present disclosure. In some embodiments, system 800 comprises a platform 810 which may host, or otherwise be incorporated into a personal computer, workstation, laptop computer, ultra-laptop computer, tablet, touchpad, portable computer, handheld computer, palmtop computer, personal digital assistant (PDA), television, video player, cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 810 may comprise any combination of a processor 820, a memory 830, video summarization system 100, a network interface 840, an input/output (I/O) system 850, a video stream source 860, a user interface 202 and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to a video stream source 860, a user interface 202, and other devices not shown such as a speaker, keyboard, mouse, etc. In some embodiments, user interface 202 may include a display element such as, for example, a computer display screen, touchscreen display, video monitor, television-like device, and/or a television.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Video summarization system 100 is configured to perform video summarization based on speaker segmentation and clustering to identify persons and scenes of interest. The video may be provided by any suitable video stream source 860, such as, for example, a video player or internet streaming source. Audio segments from the video, in which the voice of a single speaker is detected, are grouped or clustered together. Portions of these clustered audio segments are provided to a user for identification of the speaker as a person of interest. The video can then be summarized as a combination of scenes that include the speaker of interest. Video summarization system 100 may include any or all of the components illustrated in FIGS. 2-6, as described above. Video summarization system 100 can be implemented or otherwise used in conjunction with a variety of suitable software and/or hardware that is coupled to or that otherwise forms a part of platform 810. Video summarization system 100 can additionally or alternatively be implemented or otherwise used in conjunction with user I/O devices that are capable of providing information to, and receiving information and commands from, a user. These I/O devices may include any number or combination of devices collectively referred to as user interface 202. In some embodiments, user interface 202 may include a textual input device such as a keyboard, and a pointer-based input device such as a mouse. Other input/output devices that may be used in other embodiments include a display element, touchscreen, a touchpad, speaker and/or a microphone. Still other input/output devices can be used in other embodiments.

In some embodiments, video summarization system 100 may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the video summarization methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for video summarization, the method comprising: detecting, by a processor, one or more segments of audio content, the segments including the voice of a single speaker, the audio content extracted from a video stream; grouping, by the processor, the one or more detected segments into an audio cluster associated with the single speaker; providing, by the processor, a portion of the audio cluster to a user; receiving, by the processor, an indication from the user that the single speaker is a person of interest (POI); extracting, by the processor, segments of interest (SOIs) from the video stream, each SOI associated with a scene that includes the POI; and combining, by the processor, the extracted SOIs into a summarization video.

Example 2 includes the subject matter of Example 1, and further includes extracting feature vectors from the audio cluster, matching the feature vectors to an existing speaker model, and designating the existing speaker model as the speaker model associated with the single speaker.

Example 3 includes the subject matter of Example 2, and further includes, in response to a failure of the matching, generating a new speaker model based on the extracted feature vectors, and designating the new speaker model as the speaker model associated with the single speaker.

Example 4 includes the subject matter of Example 3, wherein the feature vector extraction and speaker model designation is performed in response to receiving the indication that the single speaker is a POI.

Example 5 includes the subject matter of Example 3 or 4, and further includes applying the designated speaker model to the audio content to detect portions of the audio content associated with one or more of the POIs; determining scene boundaries of the video stream based on the detected portions; and combining portions of the video stream within the scene boundaries to generate a summarization video.

Example 6 includes the subject matter of any of Examples 3 through 5, and further includes receiving an identification of the POI from the user, and associating it with the designated speaker model.

Example 7 includes the subject matter of any of Examples 3 through 6, and further includes storing the designated speaker model in a speaker model database for video summarization of additional video streams.

Example 8 includes the subject matter of any of the previous Examples, and further includes tracking a frequency of occurrence of POIs to generate a list of favorite POIs for video summarization of additional video streams.

Example 9 includes a system for video summarization, the system comprising: a speaker clustering circuit to detect one or more segments of audio content, the segments including the voice of a single speaker, the audio content extracted from a video stream; and to group the one or more detected segments into an audio cluster associated with the single speaker; a person of interest marking circuit to provide a portion of the audio cluster to a user and to receive an indication from the user that the single speaker is a person of interest (POI); and a video summarization circuit to extract segments of interest (SOIs) from the video stream, each SOI associated with a scene that includes the POI, and to combine the extracted SOIs into a summarization video.

Example 10 includes the subject matter of Example 9, and further includes a feature extraction and speaker modelling circuit to extract feature vectors from the audio cluster, match the feature vectors to an existing speaker model, and designate the existing speaker model as the speaker model associated with the single speaker.

Example 11 includes the subject matter of Example 10, wherein the feature extraction and speaker modelling circuit is further to, in response to a failure of the matching, generate a new speaker model based on the extracted feature vectors, and designate the new speaker model as the speaker model associated with the single speaker.

Example 12 includes the subject matter of Example 11, wherein the feature vector extraction and speaker model designation is performed in response to receiving the indication that the single speaker is a POI.

Example 13 includes the subject matter of Example 11 or 12, and further includes a speaker model application circuit to apply the designated speaker model to the audio content to detect portions of the audio content associated with one or more of the POIs; a segment boundary determination circuit to determine scene boundaries of the video stream based on the detected portions; and a segment combination circuit to combine portions of the video stream within the scene boundaries to generate a summarization video.

Example 14 includes the subject matter of any of Examples 11 through 13, wherein the POI marking circuit is further to receive an identification of the POI from the user, and associate it with the designated speaker model.

Example 15 includes the subject matter of any of Examples 11 through 14, wherein the feature extraction and speaker modelling circuit is further to store the designated speaker model in a speaker model database for video summarization of additional video streams.

Example 16 includes the subject matter of any of Examples 9 through 15, wherein the POI marking circuit is further to track a frequency of occurrence of POIs to generate a list of favorite POIs for video summarization of additional video streams.

Example 17 includes at least one non-transitory computer readable storage medium having instructions encoded thereon that, when executed by one or more processors, result in the following operations for video summarization, the operations comprising: detecting one or more segments of audio content, the segments including the voice of a single speaker, the audio content extracted from a video stream; grouping the one or more detected segments into an audio cluster associated with the single speaker; providing a portion of the audio cluster to a user; receiving an indication from the user that the single speaker is a person of interest (POI); extracting segments of interest (SOIs) from the video stream, each SOI associated with a scene that includes the POI; and combining the extracted SOIs into a summarization video.

Example 18 includes the subject matter of Example 17, the operations further comprising extracting feature vectors from the audio cluster, matching the feature vectors to an existing speaker model, and designating the existing speaker model as the speaker model associated with the single speaker.

Example 19 includes the subject matter of Example 18, the operations further comprising, in response to a failure of the matching, generating a new speaker model based on the extracted feature vectors, and designating the new speaker model as the speaker model associated with the single speaker.

Example 20 includes the subject matter of Example 19, wherein the feature vector extraction and speaker model designation is performed in response to receiving the indication that the single speaker is a POI.

Example 21 includes the subject matter of Example 19 or 20, the operations further comprising: applying the designated speaker model to the audio content to detect portions of the audio content associated with one or more of the POIs; determining scene boundaries of the video stream based on the detected portions; and combining portions of the video stream within the scene boundaries to generate a summarization video.

Example 22 includes the subject matter of any of Examples 19 through 21, the operations further comprising receiving an identification of the POI from the user, and associating it with the designated speaker model.

Example 23 includes the subject matter of any of Examples 19 through 22, the operations further comprising storing the designated speaker model in a speaker model database for video summarization of additional video streams.

Example 24 includes the subject matter of any of Examples 17 through 23, the operations further comprising tracking a frequency of occurrence of POIs to generate a list of favorite POIs for video summarization of additional video streams.

Example 25 includes a system for video summarization, the system comprising: means for detecting one or more segments of audio content, the segments including the voice of a single speaker, the audio content extracted from a video stream; means for grouping the one or more detected segments into an audio cluster associated with the single speaker; means for providing a portion of the audio cluster to a user; means for receiving an indication from the user that the single speaker is a person of interest (POI); means for extracting segments of interest (SOIs) from the video stream, each SOI associated with a scene that includes the POI; and means for combining, by the processor, the extracted SOIs into a summarization video.

Example 26 includes the subject matter of Example 25, and further includes means for extracting feature vectors from the audio cluster, means for matching the feature vectors to an existing speaker model, and means for designating the existing speaker model as the speaker model associated with the single speaker.

Example 27 includes the subject matter of Example 26, and further includes means for generating, in response to a failure of the matching, a new speaker model based on the extracted feature vectors, and means for designating the new speaker model as the speaker model associated with the single speaker.

Example 28 includes the subject matter of Example 27, wherein the feature vector extraction and speaker model designation is performed in response to receiving the indication that the single speaker is a POI.

Example 29 includes the subject matter of Example 27 or 28, and further includes means for applying the designated speaker model to the audio content to detect portions of the audio content associated with one or more of the POIs; means for determining scene boundaries of the video stream based on the detected portions; and means for combining portions of the video stream within the scene boundaries to generate a summarization video.

Example 30 includes the subject matter of any of Examples 27 through 29, and further includes means for receiving an identification of the POI from the user, and means for associating it with the designated speaker model.

Example 31 includes the subject matter of any of Examples 27 through 30, and further includes means for storing the designated speaker model in a speaker model database for video summarization of additional video streams.

Example 32 includes the subject matter of any of Examples 25 through 31, and further includes means for tracking a frequency of occurrence of POIs to generate a list of favorite POIs for video summarization of additional video streams.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for video summarization, the method comprising:
    detecting, by a processor, one or more groups of audio content, wherein each of the one or more groups includes one or more audio segments, the one or more audio segments including the voice of a single distinct speaker, the one or more groups of audio content extracted from a video stream;
    grouping, by the processor, the one or more detected audio segments of each of the one or more groups into one or more audio clusters, each audio cluster associated with a corresponding single distinct speaker;
    providing, by the processor, a portion of one or more of the audio clusters to a user;
    receiving, by the processor, input from the user that at least one of the single distinct speakers associated with the one or more of the audio clusters is a person of interest (POI), the input based at least on the provided portion of the corresponding audio cluster;
    extracting, by the processor, segments of interest (SOIs) from the video stream, each SOI associated with a scene that includes the at least one POI; and
    combining, by the processor, the extracted SOIs into a summarization video.

2. The method of claim 1, wherein each existing single distinct speaker is associated with a speaker model, the method further comprising extracting feature vectors from one or more of the audio clusters, matching the feature vectors to an existing speaker model, and designating the existing speaker model as the speaker model associated with the corresponding single distinct speaker.

3. The method of claim 2, further comprising, in response to a failure of the matching, generating a new speaker model based on the extracted feature vectors, and designating the new speaker model as the speaker model associated with the corresponding single distinct speaker.

4. The method of claim 3, further comprising:
    applying the designated speaker model to the audio content to detect portions of the audio content associated with one or more of the POIs;
    determining scene boundaries of the video stream based on the detected portions; and combining portions of the video stream within the scene boundaries to generate a summarization video.

5. The method of claim 3, wherein receiving input from the user that at least one of the single distinct speakers associated with the one or more of the audio clusters is a POI includes receiving an identification of the at least one POI from the user, the method further including associating that at least one POI with the designated speaker model.

6. The method of claim 3, further comprising storing the designated speaker model in a speaker model database for video summarization of additional video streams.

7. The method of claim 1, the method further comprising: providing a user interface configured to allow the user to indicate that the at least one single distinct speaker is a POI, wherein SOI extraction is performed in response to receiving, via the user interface, the input that the at least one single distinct speaker is a POI.

8. The method of claim 1, further comprising tracking a frequency of occurrence of POIs to generate a list of favorite POIs for video summarization of additional video streams.

9. A system for video summarization, the system comprising:
a speaker clustering circuit to detect one or more groups of audio content, wherein each of the one or more groups includes one or more audio segments, the one or more audio segments including the voice of a single distinct speaker, the one or more groups of audio content extracted from a video stream; and to group the one or more detected audio segments of each of the one or more groups into one or more audio clusters, each audio cluster associated with a corresponding single distinct speaker;
a person of interest marking circuit to provide a portion of one or more of the audio clusters to a user and input from the user that at least one of the single distinct speakers is a person of interest (POI), the input based at least on the provided portion of the corresponding audio cluster; and
a video summarization circuit to extract segments of interest (SOIs) from the video stream, each SOI associated with a scene that includes the at least one POI, and to combine the extracted SOIs into a summarization video.

10. The system of claim 9, further comprising a feature extraction and speaker modelling circuit to extract feature vectors from one or more of the audio clusters, match the feature vectors to an existing speaker model, and designate the existing speaker model as the speaker model associated with the corresponding single distinct speaker.

11. The system of claim 10, wherein the feature extraction and speaker modelling circuit is further configured to, in response to a failure of the matching, generate a new speaker model based on the extracted feature vectors, and designate the new speaker model as the speaker model associated with the corresponding single distinct speaker.

12. The system of claim 11, wherein the feature vector extraction and speaker model designation is performed in response to receiving the input that the at least one single distinct speaker is a POI, and wherein the input is received via a graphical user interface presented to the user.

13. The system of claim 11, further comprising:
a speaker model application circuit configured to apply the designated speaker model to the audio content to detect portions of the audio content associated with one or more of the POIs;
a segment boundary determination circuit configured to determine scene boundaries of the video stream based on the detected portions; and
a segment combination circuit configured to combine portions of the video stream within the scene boundaries to generate a summarization video.

14. The system of claim 11, wherein the POI marking circuit is further configured to receive an identification of the at least one POI from the user, and associate it with the designated speaker model.

15. The system of claim 11, wherein the feature extraction and speaker modelling circuit is further configured to store the designated speaker model in a speaker model database for video summarization of additional video streams.

16. The system of claim 9, wherein the POI marking circuit is further configured to track a frequency of occurrence of POIs to generate a list of favorite POIs for video summarization of additional video streams.

17. At least one non-transitory computer readable storage medium having instructions encoded thereon that, when executed by one or more processors, result in the following operations for video summarization, the operations comprising:
detecting one or more groups of audio content, wherein each of the one or more groups includes one or more audio segments, the one or more audio segments including the voice of a single distinct speaker, the one or more groups of audio content extracted from a video stream;
grouping the one or more detected audio segments of each of the one or more groups into one or more audio clusters, each audio cluster associated with a corresponding single distinct speaker;
providing a portion of one or more of the audio clusters to a user;
receiving input from the user that at least one of the single distinct speakers is a person of interest (POI), the input based on the provided portion of the corresponding audio cluster;
extracting segments of interest (SOIs) from the video stream, each SOI associated with a scene that includes the at least one POI; and
combining the extracted SOIs into a summarization video.

18. The computer readable storage medium of claim 17, the operations further comprising extracting feature vectors from one or more of the audio clusters, matching the feature vectors to an existing speaker model, and designating the existing speaker model as the speaker model associated with the corresponding single distinct speaker.

19. The computer readable storage medium of claim 18, the operations further comprising, in response to a failure of the matching, generating a new speaker model based on the extracted feature vectors, and designating the new speaker model as the speaker model associated with the corresponding single distinct speaker.

20. The computer readable storage medium of claim 19, the operations further comprising:
applying the designated speaker model to the audio content to detect portions of the audio content associated with one or more of the POIs;
determining scene boundaries of the video stream based on the detected portions; and
combining portions of the video stream within the scene boundaries to generate a summarization video.

21. The computer readable storage medium of claim 19, the operations further comprising receiving an identification of the at least one POI from the user, and associating it with the designated speaker model.

22. The computer readable storage medium of claim 19, the operations further comprising storing the designated speaker model in a speaker model database for video summarization of additional video streams.

23. The computer readable storage medium of claim 17, the operations further comprising: providing a user interface configured to allow the user to indicate that the at least one single distinct speaker is a POI, wherein SOI extraction is performed in response to receiving, via the user interface, the input that the at least one single distinct speaker is a POI.

24. The computer readable storage medium of claim 17, the operations further comprising tracking a frequency of occurrence of POIs to generate a list of favorite POIs for video summarization of additional video streams.

* * * * *